United States Patent [19]

Bennett

[11] 3,949,824

[45] Apr. 13, 1976

[54] DRIVE ARRANGEMENTS FOR MECHANICAL HANDLING VEHICLES

[75] Inventor: Sydney Bennett, Batley, England

[73] Assignee: Joshua Shaw & Sons Limited, United Kingdom

[22] Filed: June 24, 1974

[21] Appl. No.: 481,997

Related U.S. Application Data

[63] Continuation-in-part of Ser. No. 358,684, May 9, 1973, abandoned.

[30] Foreign Application Priority Data

Feb. 23, 1973 United Kingdom................ 8926/73

[52] U.S. Cl............................................. 180/66 R
[51] Int. Cl.²...................... B60K 7/00; B60K 17/14
[58] Field of Search ..... 180/66 R, 66 F, 66 B, 44 F, 180/44 M; 180/66 R, 60 F, 66 B, 75, 70 R, 44 F, 44 M

[56] References Cited
UNITED STATES PATENTS

| | | | |
|---|---|---|---|
| 1,773,587 | 8/1930 | Lape | 180/66 R |
| 1,803,932 | 5/1931 | Dooley | 180/66 R |
| 1,926,692 | 9/1933 | Tarbox | 180/66 R UX |
| 2,418,123 | 4/1947 | Joy | 180/66 F |
| 3,236,187 | 2/1966 | Eyer | 180/66 F |
| 3,422,917 | 1/1969 | Guinot | 180/66 R |
| 3,485,315 | 12/1969 | Bergren | 180/66 R |
| 3,493,067 | 2/1970 | Rumsey | 180/66 F X |

FOREIGN PATENTS OR APPLICATIONS 1,022,415  3/1966  United Kingdom ............... 180/66 F

*Primary Examiner*—M. H. Wood, Jr.
*Assistant Examiner*—Milton L. Smith
*Attorney, Agent, or Firm*—Wolf, Greenfield & Sacks

[57] ABSTRACT

A mechanical handling vehicle of comparatively slow speed having a drive arrangement comprising an axle with a hydraulic motor of a hydrostatic transmission mounted at each end thereof, the axle having spaced axially extending passages with which the motors communicate hydraulically for the supply and return of hydraulic fluid to and from the motors. The motors may be of a slow speed type and have their rotors secured directly to the vehicle drive wheels. Preferably there are two such through axially extending passages arranged so that depending upon the operation of the pump output one of the passages conveys fluid to the motors and the other one conveys the return flow back to the pump, the roles of these passages being reversed when the pump is reversed. The pump may be built into the axle or mounted thereon in direct hydraulic communication with the axially extending passages.

1 Claim, 5 Drawing Figures

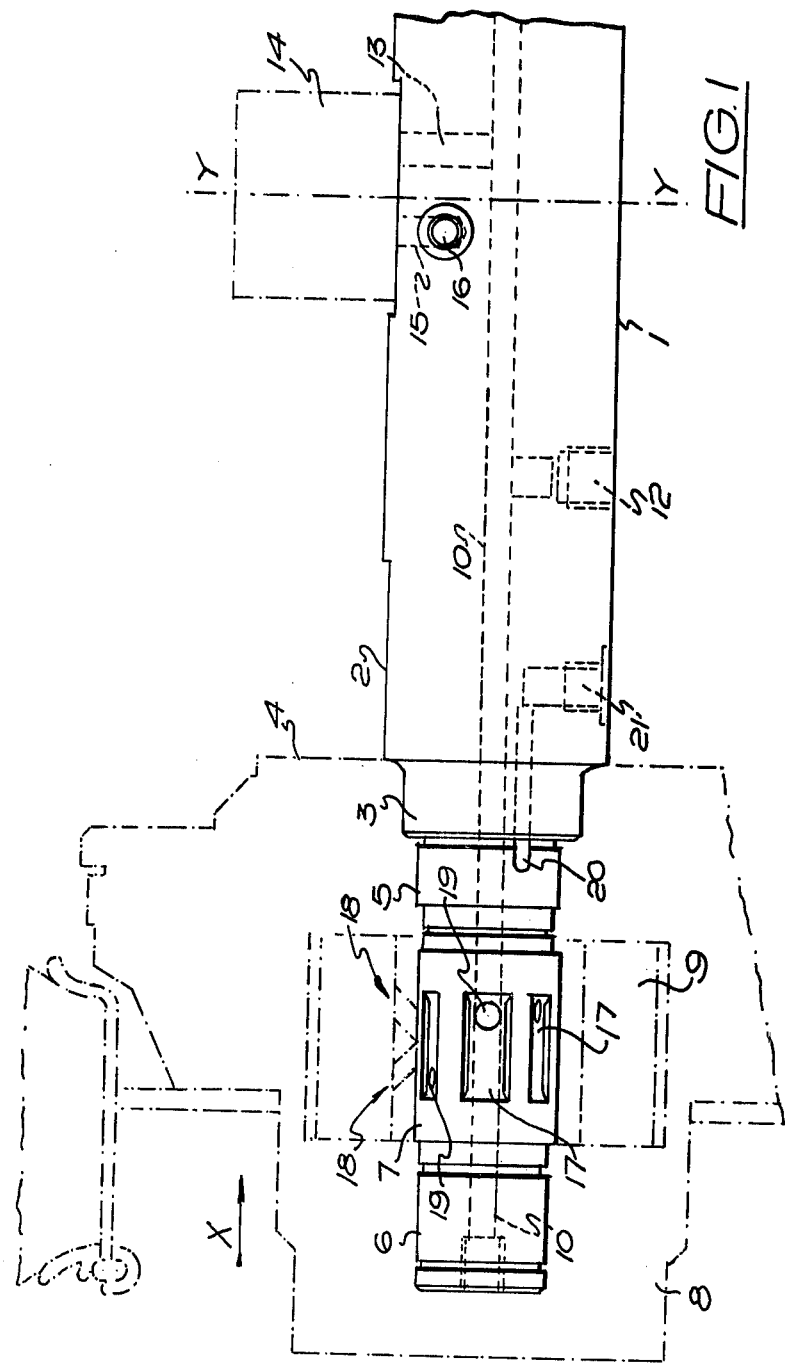

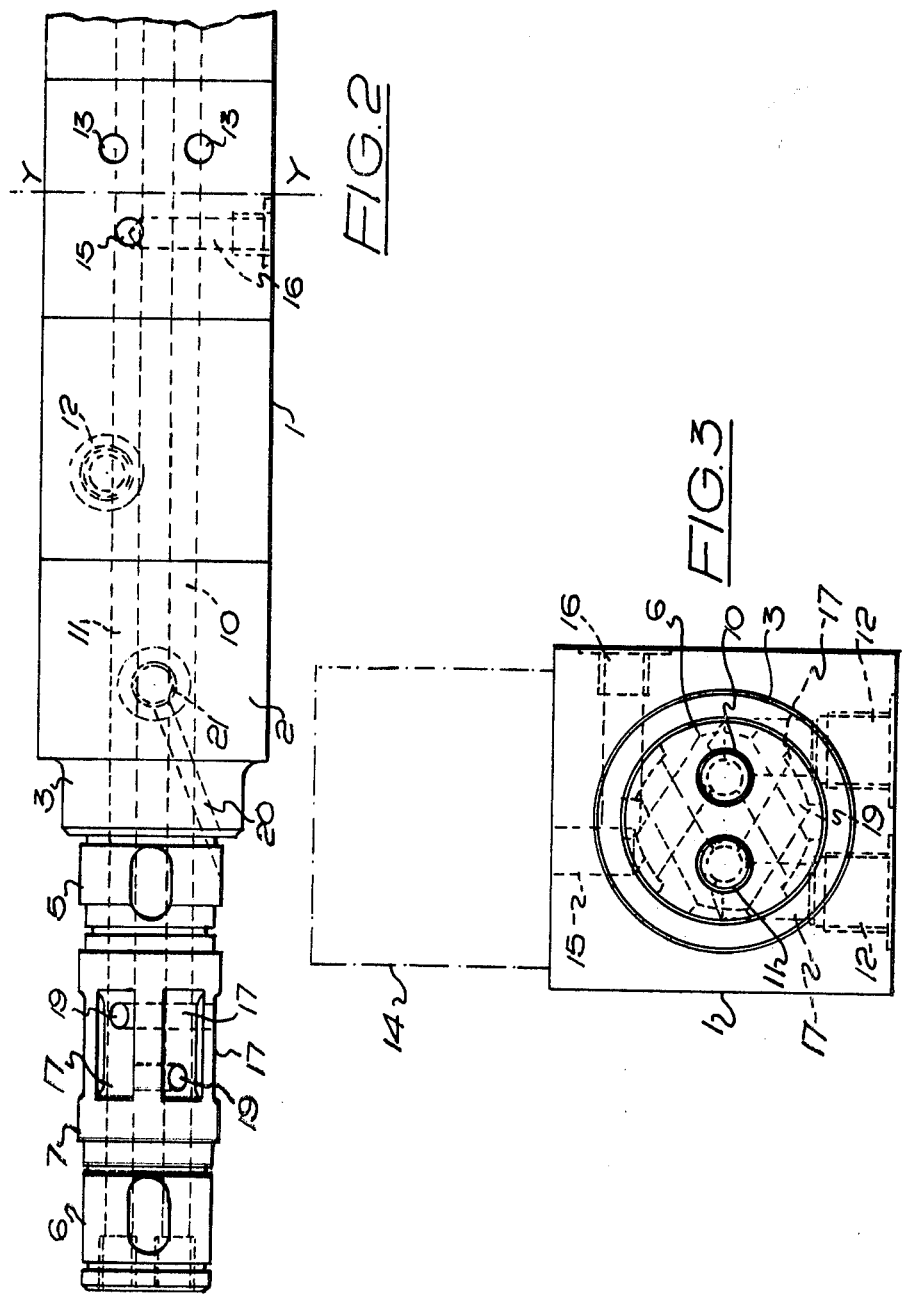

DRIVE ARRANGEMENTS FOR MECHANICAL HANDLING VEHICLES

This invention, moreover constitutes a continuation-in-part of my Application Ser. No. 358,684 filed May 9, 1973 which is now abandoned.

This invention relates to mechanical handling vehicles such as side loaders, front loaders, towing trucks, dumper vehicles and fork lift trucks, which generally speaking are slow moving i.e. of maximum speed somewhere in the region of 15 m.p.h., and in particular concerns a driving arrangement for such vehicles.

Hydrostatic transmissions, because of their low speed, high torque and infinitely adjustable transmission ratios, are eminently suitable for the drives for mechanical handling vehicles. The use of such transmissions is attended by certain drawbacks, a notable one of which is the sealing of the hydraulic circuit or circuits of the transmission. A common complaint of users of mechanical handling vehicles having hydrostatic transmissions is the dripping of hydraulic fluid (usually oil) from faulty seals. With this invention, I aim to provide a drive arrangement for a mechanical handling vehicle which utilizes a hydrostatic transmission and wherein there will be less tendency to leakage of the hydraulic circuits than at least some of the arrangements heretofore used or proposed.

According to the my invention, the drive arrangement for a mechanical handling vehicle employs a one-piece solid axle having a hydraulic motor of a hydrostatic transmission mounted at each end thereof. The axle has spaced axially extending passages with which the motors communicate hydraulically for the supply and return of hydraulic fluid to and from said motors.

The hydraulic motors are preferably slow speed motors (i.e. maximum revolutions in the region of 150-200 r.p.m.) so that the drive wheels (whether road wheels or track wheels) of the mechanical handling vehicle can be secured directly to the motor rotors.

The axle has two through axial passages for hydraulic communication between the axle ends. The pump of the hydrostatic transmission has its inlet and outlet ports connected to the axial passages so that depending upon the pump operation one or other of said passages will transmit the hydraulic fluid under pressure to both motors to drive them while, the other passage, acts as the return, low pressure passage of the motors. In operation the motors will be driven in (say) the forward direction, but when the pump output is reversed, the pressurization of the fluid in said passage will be reversed, causing the motors to rotate in the reverse direction. The pump may be built into the axle or mounted thereon in direct hydraulic communication with said axial passages (that is to say without hose or pipe connections) but more usually it will be hydraulically connected by flexible hose or pipes to said passages.

The invention also provides a mechanical handling vehicle with a drive arrangement as aforesaid, including a pump and a prime mover for driving the pump, the motors being drivingly connected to drive wheels of the vehicle.

Where the pump is connected hydraulically to the axle by flexible pipes, sealing points to the axle are needed at the two connections of the flexible pipes to the axial passages, and at the motor leakage drain which feeds leakage from the motors back to the pump, as is common practice in hydrostatic transmissions for maintaining a heat balance between the motors and pump. Further, a pressure relief connection is needed which automatically connects to whichever of the said axial passages for the time being contains the high pressure fluid, and which serves to allow a purge of fluid from the closed pump-motors circuit, as is also common in hydrostatic transmissions. In the invention, the axle may, of course, require additional passages to accommodate the motor leakage drain and the pressure relief connection.

By reducing the required number of sealing points in the hydraulic circuits of the hydrostatic transmission, I believe that I have provided a drive arrangement which will be less prone to leakage than known arrangements having a larger number of sealing points where leakage could occur. By reducing the number of sealing points, it is believed that the cost of the drive arrangement may be less than other known arrangements.

Some embodiments of the invention will now be described by way of example with reference to the accompanying drawings, wherein:

FIG. 1, is a broken plan representing a little more than one end portion of an axle, motor and wheel assembly according to the invention with only the outline of the motor and wheel being indicated;

FIG. 2 is an elevation of the axle portion shown in FIG. 1;

FIG. 3 is an end view seen in the direction of arrow X in FIG. 1 omitting the motor and wheel;

Figure 4:
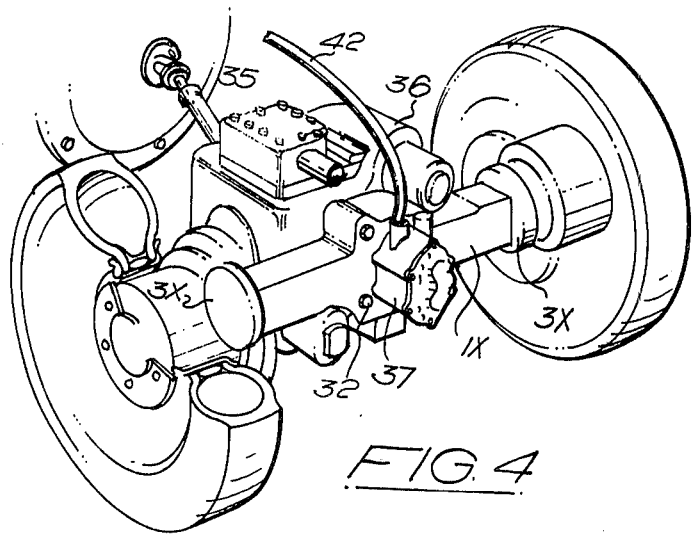
FIG. 4 is a schematic perspective view showing a complete axle, motor and wheel assembly with a pump for driving the motors mounted upon the axle thereby forming a unitary construction.

Referring first to FIGS. 1–3 of these drawings, the one-piece axle is symmetrical about its lateral center line Y-Y and the following description of one half applies equally to the other half. The main body 1 of the axle is shown as being of solid square cross-section and has a flat 2 for securing it to the chassis or undercarriage of a vehicle by suitable means (not shown). The axle end is reduced at 3 to provide a support for a brake plate 4 secured thereto by suitable means (not shown) and is then further reduced to provide cylindrical supports 5, 6 and an intermediate portion 7 about which the motor 8 and its rotor and piston 9 are mounted. The motor may be of a known type and itself forms no part of the invention.

The axle has two parallel axial bores or passages 10, 11 drilled from end to end and then plugged at their ends. Each passage communicates with a fluid supply and return opening 12 for coupling directly with the pump and also communicates by a duct 13 with a port of a relief valve 14 mounted on the axle, this relief valve communicating also with the pump through ducts 15, 16 in the axle.

The intermediate portion 7 is formed with a circumferential ring of recesses 17 (there being six of these in the illustrated construction) which can register with feed ducts or ports 18 for the motor pistons. These recesses communicate by branch ducts 19 with the axial bores 10, 11, one set of alternate recesses serving one bore and the other set serving the other bore. Each of these ducts 19 can be drilled in the axle so as not to intersect any other duct and some of these are indicated in FIG. 2 and 3.

A further duct 20 is drilled in the axle to lead to a radial outlet 21 which can be coupled by a hose to the pump reservoir, thus providing a motor leakage drain which, being at only a low pressure, can be carried by a hose without trouble from leakage at the joints.

It will be seen that by the above described construction there need not be any hose or pipe connections except the low pressure motor leakage drain, the other hydraulic connections being "direct" and thereby more easily made proof against leakage.

Figure 5:
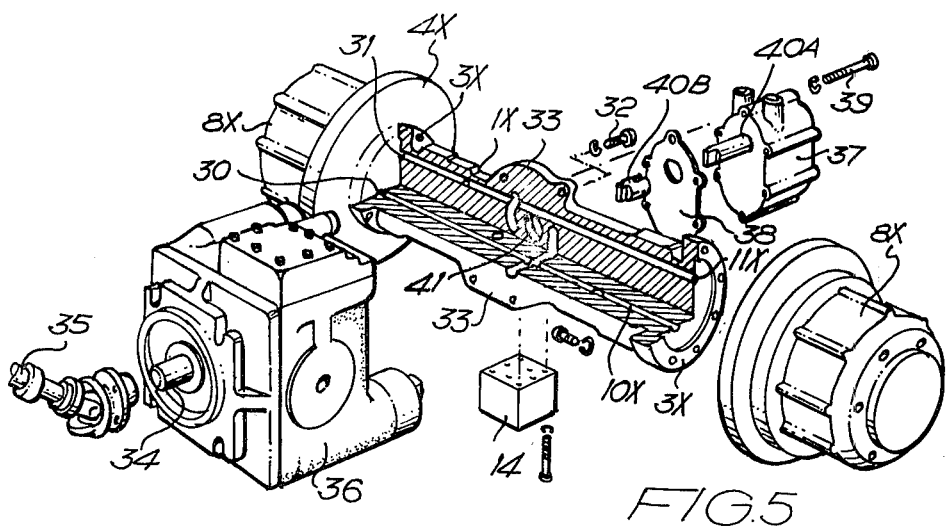
FIG. 5 represents an exploded perspective view of the unitary construction shown in FIG. 4 with the axle being shown in quarter longitudinal section.

In a modification of the axle construction to accommodate another known type of hydraulic motor and illustrated in FIGS. 4 and 5, each end of the axle 1X is formed with (or may have secured thereto) a flange 3X for bolting to the end plate 4X of the motor assembly 8X. The axle portions, 3, 5, 7 and 6 shown in FIGS. 1 to 3 of the drawings are not provided in this case, but the two axial passages 10X, 11X register with corresponding extension passages 30, 31 provided in the center part of each motor through the plate 4X to transmit the flow in hydraulic fluid to and from the motor. Thus, although in this case also the motors are mounted at each end of the axle, each axle end does not extend through the adjacent motor as in the construction shown in FIGS. 1 to 3 of the drawings, but the direct coupling together of the axial passages, 10X, 11X with the extension passages 30, 31 obviates hose or pipe connections and thereby reduces the risks of leakage.

FIGS. 4 and 5 of the drawings depict a further feature of the invention which comprises the mounting of the hydrostatic pump upon the axle itself in direct hydraulic communication with the axial bores, thereby providing a unitary construction of the whole transmission assembly as opposed to mounting the pump separately and coupling it by hoses or pipes to the axial passages in the axle. The pump 36 is secured by threaded studs such as 32 to an enlarged surface 33 provided centrally on one face of the axle 1X. The delivery and return ports of the pump are in register with and thus directly connected to the supply and return openings communicating with the axial passages 10X, 11X. In this case, the said supply and return openings are both located near the center of the axle length so that the pump can be located centrally also. The relief valve 14 mentioned in connection with FIGS. 1 to 3 is shown mounted on the underside of the axle, and the pump input shaft 34 is driven through a universal coupling shaft connection 35 from an engine or other prime mover mounted on the vehicle.

There is shown in FIGS. 4 and 5 a charge pump 37 which is secured with its gasket 38 by screwed studs such as 39 to the face of the axle opposite to the face to which the pump 36 is secured and which is driven from the pump 36 through a two-piece shaft 40A, 40B passing through an aperture 41 in the axle. This charge pump 37 is connected by a flexible hose 42 to the oil reservoir (not shown) of the transmission system. The purpose of this charge pump is to draw oil from the reservoir and feed it to the pump 36 to make up for oil losses due to internal leakage as is customary in hydrostatic transmission systems, although normally the charge pump is mounted directly on the pump which it serves.

Although in the foregoing description the axially extending bores or passages in the axle have been described as being produced by drilling in what would generally be a forged solid axle, it may be more convenient or commercially advantageous to cast the axle, and in so doing these bores or passages may be produced by coring during the casting process. This would have the advantage also of enabling the bores or passages to be other than straight so that their paths could avoid obstructing or conflicting with any other passages or other internal features which it is desired to incorporate in the axle. The scope of the invention as claimed is intended to encompass this alternative mode of construction.

I claim:

1. In a drive arrangement for a mechanical handling vehicle comprising the combination of
   1. 2 one piece solid axle extending across the vehicle substantially from side to side thereof and supporting a ground wheel at each end of the axle, and
   2. a hydrostatic transmission having (a) a hydraulic motor mounted at each end of said axle for driving each of said wheels, (b) a pump for supplying hydraulic fluid to the motors, the improvement wherein said one piece axle has formed therein two spaced apart passages extending axially between the motors by which said motors communicate hydraulically with one another and with said pump whereby hydraulic fluid under pressure can be transmitted selectively through either one of the axial passages to drive both motors while the low pressure fluid from both motors returns through the other axial passage, and said pump is mounted directly on said axle with the ports of said pump in direct communication with said axial passages.

* * * * *